United States Patent
Sakai (10) Patent No.: US 9,550,499 B2
(45) Date of Patent: Jan. 24, 2017

(54) WORK VEHICLE AND CONTROL METHOD FOR WORK VEHICLE

(71) Applicant: Komatsu Ltd., Tokyo (JP)

(72) Inventor: Katsuyuki Sakai, Naka-gun (JP)

(73) Assignee: Komatsu Ltd., Tokyo (JP)

(*) Notice: Subject to any disclaimer, the term of this patent is extended or adjusted under 35 U.S.C. 154(b) by 0 days.

(21) Appl. No.: 14/441,916

(22) PCT Filed: Jul. 30, 2014

(86) PCT No.: PCT/JP2014/070076
§ 371 (c)(1),
(2) Date: May 11, 2015

(87) PCT Pub. No.: WO2015/033708
PCT Pub. Date: Mar. 12, 2015

(65) Prior Publication Data
US 2016/0031448 A1    Feb. 4, 2016

(51) Int. Cl.
*B60W 50/02* (2012.01)
*G05B 9/02* (2006.01)
(Continued)

(52) U.S. Cl.
CPC ............ *B60W 50/02* (2013.01); *B60R 16/023* (2013.01); *B60W 10/06* (2013.01); *B60W 10/18* (2013.01);
(Continued)

(58) Field of Classification Search
CPC ... G05B 9/02; G05B 15/02; G05B 2219/2616; B60R 16/023; B60W 10/06; B60W 10/18; B60W 50/02; G05D 2201/021; G05D 1/0088; G05D 1/0055
See application file for complete search history.

(56) References Cited

U.S. PATENT DOCUMENTS 6,633,800 B1*  10/2003  Ward ................... B60W 50/02
                                                180/167
6,751,535 B2    6/2004  Mori
(Continued)

FOREIGN PATENT DOCUMENTS

JP     06-028030 A      2/1994
JP     2001-142794 A    5/2001
(Continued)

OTHER PUBLICATIONS

International Search Report mailed Sep. 9, 2014, issued for PCT/JP2014/070076.
(Continued)

*Primary Examiner* — Yuen Wong
(74) *Attorney, Agent, or Firm* — Locke Lord LLP (57) ABSTRACT

A work vehicle includes: a first control system that controls a traveling of a work vehicle; a second control system that controls the traveling of the work vehicle via the first control system by using set information; a first communication line used for communication between the first control system and the second control system; and a second communication line that transmits information to the first control system from the second control system, wherein the second control system generates information for controlling an engine of the work vehicle and information for controlling a brake device of the work vehicle, and transmits the information for controlling the engine and the information for controlling the brake device to the first control system via the second communication line by an information transmission system different from an information transmission system by the first communication line.

8 Claims, 5 Drawing Sheets

(51) Int. Cl.
*B60R 16/023* (2006.01)
*B60W 10/06* (2006.01)
*B60W 10/18* (2012.01)
*G05D 1/00* (2006.01)
*G05B 15/02* (2006.01)

(52) U.S. Cl.
CPC ............... *G05B 9/02* (2013.01); *G05D 1/0055* (2013.01); *G05D 1/0088* (2013.01); *G05B 15/02* (2013.01); *G05B 2219/2616* (2013.01); *G05D 2201/021* (2013.01)

(56) References Cited

U.S. PATENT DOCUMENTS

| | | |
|---|---|---|
| 8,358,578 B2 | 1/2013 | Murashige et al. |
| 2010/0280634 A1 | 11/2010 | Murashige et al. |

FOREIGN PATENT DOCUMENTS

| | | | |
|---|---|---|---|
| JP | 2002-034308 A | | 2/2002 |
| JP | 2002-215236 A | | 7/2002 |
| JP | 2008184979 A | * | 8/2008 |
| JP | 2009-154661 A | | 7/2009 |
| JP | 2014-110361 A | | 6/2014 |

OTHER PUBLICATIONS

Office Action dated Jul. 13, 2015, issued for the Australian Patent Application No. 2014316433.

* cited by examiner

WORK VEHICLE AND CONTROL METHOD FOR WORK VEHICLE

FIELD

The present invention relates to a work vehicle and a control method for a work vehicle.

BACKGROUND

Recently, it has been proposed to allow a work vehicle to automatically travel in an unmanned state on a preset traveling route in, for example, a mine (for example, Patent Literature 1). In the work vehicle used for this purpose, information necessary for allowing the work vehicle to travel in an unmanned state is exchanged among various control devices in the work vehicle via a communication line in the work vehicle.

CITATION LIST

Patent Literature

Patent Literature 1: Japanese Unexamined Patent Publication No. 2002-215236

SUMMARY

Technical Problem

An emergency signal line for backup is considered to be provided to prevent an occurrence of any trouble even if a signal line is in failure. However, when a communication system for the normal signal line and a communication system for the emergency signal line are the same, and one of the communication systems is affected by the same cause such as a propagation noise, the other one is also likely to be affected.

The present invention aims to provide a work vehicle that can continue an unmanned traveling even if a communication abnormality occurs in the work vehicle that is traveling in an unmanned state, and a control method for the work vehicle.

Solution to Problem

The present invention provides a work vehicle comprising: a first control system that controls a traveling of a work vehicle; a second control system that controls the traveling of the work vehicle via the first control system by using set information; a first communication line used for communication between the first control system and the second control system; and a second communication line that transmits information to the first control system from the second control system, wherein the second control system generates information for controlling an engine of the work vehicle and information for controlling a brake device of the work vehicle, and transmits the information for controlling the engine and the information for controlling the brake device to the first control system via the second communication line by an information transmission system different from an information transmission system of the communication by the first communication line.

In the present invention, it is preferable that the work vehicle comprises: a communication device provided to the work vehicle, the communication device making communication with an outside of the work vehicle, wherein the set information is information acquired from the communication device.

In the present invention, it is preferable that the first control system receives the information for controlling the engine and the information for controlling the brake device from the second control system via the second communication line, when a situation in which information is not transmitted from the second control system via the first communication line is continued.

In the present invention, it is preferable that the second control system generates a control signal formed by converting the information for controlling the engine and the information for controlling the brake device into a pulse width, and outputs the generated control signal to the second communication line.

In the present invention, it is preferable that the first control system brings the engine into an idling state to cause the brake device to generate maximum braking force, when a magnitude of the control signal is outside a normal range.

The present invention provides a work vehicle that can switch between a first driving mode for allowing the work vehicle to travel in a manned state and a second driving mode for allowing the work vehicle to travel in an unmanned state, the work vehicle comprising: a communication device provided to the work vehicle, the communication device making communication with an outside of the work vehicle; a first control system that controls a traveling of the work vehicle; a second control system that controls the traveling of the work vehicle via the first control system by using information acquired from the communication device in the second driving mode; a first communication line used for communication between the first control system and the second control system; and a second communication line that transmits information to the first control system from the second control system, wherein the second control system generates information for controlling an engine of the work vehicle and information for controlling a brake device of the work vehicle, and outputs the information for controlling the engine and the information for controlling the brake device to the first control system via the second communication line as a control signal formed by converting the generated information for controlling the engine and the information for controlling the brake device into a pulse width, when a situation in which information is not transmitted from the second control system via the first communication line is continued in the second driving mode.

The present invention provides a control method for a work vehicle that can switch between a first driving mode for allowing the work vehicle to travel in a manned state and a second driving mode for allowing the work vehicle to travel in an unmanned state, the work vehicle including a first control system that controls a traveling of the work vehicle, a second control system that controls the traveling of the work vehicle via the first control system by using set information in the second driving mode, a first communication line used for communication between the first control system and the second control system, and a second communication line that transmits information for controlling an accelerator of the work vehicle and information for controlling a brake device of the work vehicle to the first control system from the second control system with an information transmission system different from that of the first communication line, the method comprising: generating the information for controlling the engine of the work vehicle and the information for controlling the brake device of the work vehicle, and transmitting the information for controlling the engine and the information for controlling the brake device to the first control system via the second communication line as a control signal formed by converting the information for controlling the engine and the information for controlling the brake device into a pulse width, when a situation in which information is not transmitted from the second control system via the first communication line in the second driving mode is continued.

In the present invention, it is preferable that the work vehicle includes a communication device that makes communication with an outside of the work vehicle, and the set information is information acquired from the communication device.

The present invention can provide a work vehicle that can continue an unmanned traveling even if a communication abnormality occurs in the work vehicle that is traveling in an unmanned state, and a control method for the work vehicle.

DESCRIPTION OF EMBODIMENTS

An embodiment for embodying the present invention (embodiment) will be described below in detail with reference to the drawings.

Figure 1:
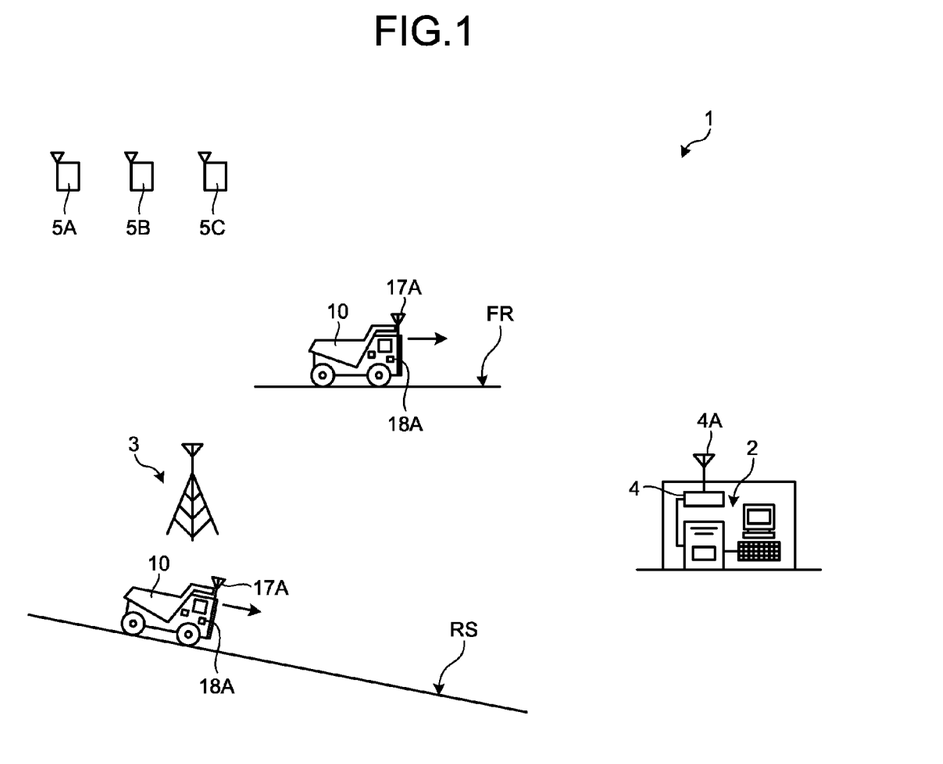
FIG. 1 is a diagram illustrating a site where a work vehicle according to the present embodiment works.

FIG. 1 is a view illustrating a site where a work vehicle according to the present embodiment works. The work vehicle according to the present embodiment is used for various works in a mine, but the work vehicle is not limited to the one used in a mine. The present embodiment describes, as the work vehicle, a dump truck 10 that serves as a transporter vehicle for carrying crushed stones, or dirt or rocks generated upon digging crushed stones. However, the work vehicle is not limited thereto. For example, the work vehicle according to the present embodiment may be a sprinkler truck that scatters water on a road, an excavator, or a wheel loader. The work vehicle according to the present embodiment may be an autonomous vehicle that autonomously generates a moving route, and moves on this moving route.

<Dump Truck in Mine>

In the present embodiment, a dump truck 10 automatically travels under control by an unmanned dump operation system 1. The unmanned dump operation system 1 includes an operation control device 2 that transmits information necessary for the automatic traveling to the dump truck 10 via a wireless communication, the information including a destination of the dump truck 10, a permission to run for each section, positional information of other vehicles, and an emergency stop command. The dump truck 10 automatically travels based on the information necessary for the automatic traveling acquired from the operation control device 2. Different from the dump truck 10 serving as a moving body, the operation control device 2 is, for example, one of control devices that are installed in a mine control center for controlling a work vehicle such as the dump truck 10 and an operation of the mine.

The operation control device 2 is connected to a wireless communication device 4 having an antenna 4A for moving the dump truck 10 working in the mine. The dump truck 10 includes an antenna 17A for receiving an instruction from the operation control device 2 or transmitting its operation information to the operation control device 2. The dump truck 10 can also receive radio waves from GPS (Global Positioning System) satellites 5A, 5B, and 5C by a GPS antenna 18A to measure its own position.

The communicable range of the radio wave output transmitted from the antenna 4A of the operation control device 2 and the antenna 17A of the dump truck 10 cannot cover the whole mine. Therefore, the unmanned dump operation system 1 includes a relay 3 that relays the radio waves transmitted from the antenna 4A and the antenna 17A. Thanks to the relay 3, the operation control device 2 can transmit a control instruction to the dump truck 10 working at a position apart from the operation control device 2, or collect the operation information from the dump truck 10. The dump truck 10 travels on a flat road FR or a sloping road RS between a soil discharge field and a loading field in a mine. The dump truck 10 will next be described.

<Dump Truck 10>

Figure 2:
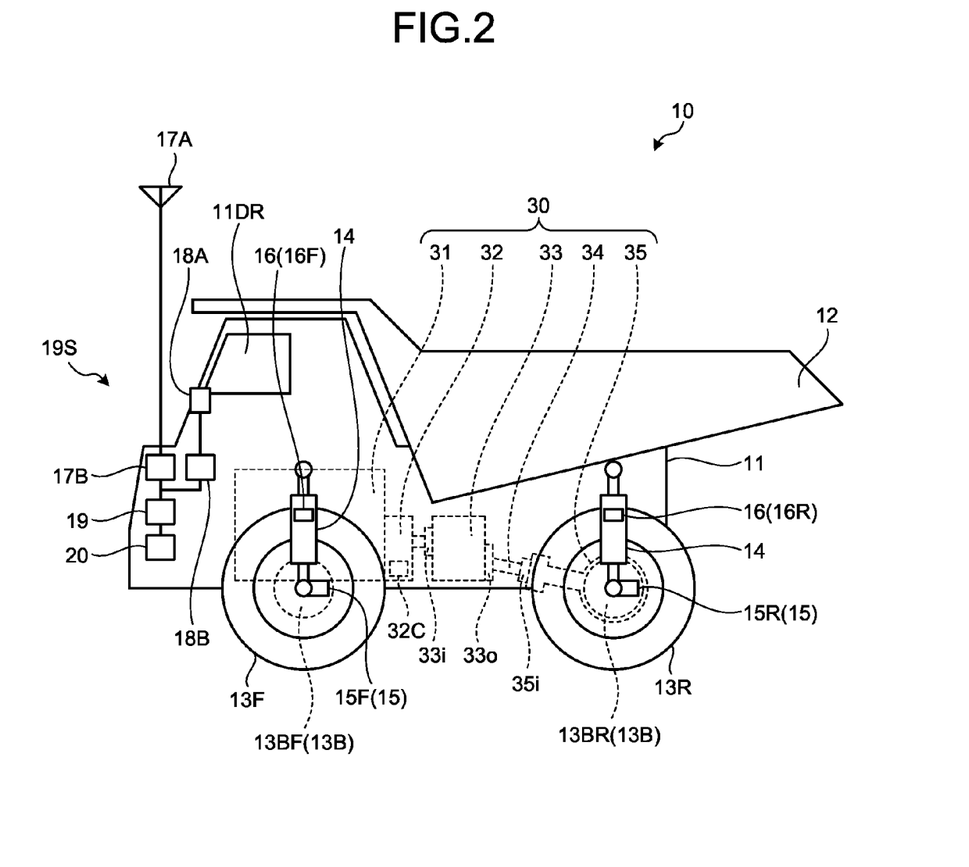
FIG. 2 is a view illustrating a dump truck according to the present embodiment.

FIG. 2 is a view illustrating the dump truck 10 according to the present embodiment. The dump truck 10 automatically works under the control by the unmanned dump operation system 1 without being operated by an operator. However, when the dump truck 10 is carried into a maintenance factory or transported from the maintenance factory, the control of the dump truck 10 by the unmanned dump operation system 1 may not be executed. In such case, the operator has to board the dump truck 10 to operate the dump truck 10. For this, the dump truck 10 has a driver's room 11DR for the operator. The driver's room 11DR includes operation devices such as a steering wheel, an accelerator pedal, and a brake pedal.

A cargo is loaded on the dump truck 10, and the loaded cargo is unloaded on a desired place. The dump truck 10 includes a body 11; a vessel 12; front wheels 13F and rear wheels 13R; a brake 13B serving as a brake device; a suspension cylinder 14; a rotation sensor 15; a suspension pressure sensor (pressure sensor) 16; an on-vehicle wireless communication device 17B to which the antenna 17A is connected; a GPS receiver 18B to which the GPS antenna 18A is connected and which serves as a position information detection device; a communication control device 19; a control system 20; and a drive device 30. The dump truck 10 also includes various mechanisms and functions of a popular transporting machine or transporting vehicle, in addition to the above devices. The present embodiment describes a rigid-type dump truck 10 having the front wheels 13F that are steered. However, the present embodiment is applicable not only to the dump truck 10 described above but alto to an articulate dump truck that includes a body divided into a front section and a rear section, which sections are connected with a free joint.

The body 11 includes the vessel 12, the front wheels 13F, the rear wheels 13R, the suspension cylinder 14, and the drive device 30. The vessel 12 functions as a pallet on which ores or dirt is loaded as a cargo. The vessel 12 is mounted on the body 11. The front wheels 13F are steering wheels that determine the advancing direction of the dump truck 10. The rear wheels 13R are drive wheels for allowing the dump truck 10 to travel. The front wheels 13F are disposed at both of right and left sides at the front of the body 11, i.e., near the driver's room 11DR. The rear wheels 13R are disposed at both of right and left sides at the rear of the body 11, i.e., at the side opposite to the driver's room 11DR.

The brake 13B includes a front-wheel brake 13BF and a rear-wheel brake 13BR. The front-wheel brake 13BF is provided to each of the front wheels 13F to stop the corresponding front wheel 13F. The rear-wheel brake 13BR is provided to each of the rear wheels 13R to stop the corresponding rear wheel 13R.

The suspension cylinder 14 is provided between the body 11 and the left and right front wheels 13F and between the body 11 and the left and right rear wheels 13R. The suspension cylinder 14 is provided to each of the left and right front wheels 13F and each of the left and right rear wheels 13R for supporting the corresponding wheel. The suspension cylinder 14 receives loads of the body 11 and the vessel 12, and the loads according to a mass of a cargo loaded on the dump truck 10. The suspension cylinder 14 contains operating oil filled therein, whereby it expands or contracts according to the mass of the cargo.

The rotation sensor 15 includes a front-wheel rotation sensor 15F detecting a rotating speed of each of the front wheels 13F and a rear-wheel rotation sensor 15R that detects a rotating speed of each of the rear wheels 13R. The front-wheel rotation sensor 15F detects the rotating speed of each of the front wheels 13F, for example, whereby the rotation sensor 15 measures a speed (referred to as a vehicle speed, as necessary) of the traveling dump truck 10. The front wheels 13F are driven wheels that are not driven by the drive device 30. Since the front wheels 13F are not driven by the drive device 30, a slippage hardly occurs between the front wheels 13F and the road surface. Therefore, the rotating speed of each of the front wheels 13F approximately corresponds to the vehicle speed of the dump truck 10.

The suspension pressure sensor 16 is provided to correspond to each of the suspension cylinders 14 provided to each of the front wheels 13F and each of the rear wheels 13R. The suspension pressure sensor 16 detects a load applied to each suspension cylinder 14. Specifically, the suspension pressure sensor 16 detects pressure of the operating oil filled in the suspension cylinder 14, thereby measuring a mass of a cargo (load capacity).

A communication device 19S includes the antenna 17A, the on-vehicle wireless communication device 17B, the GPS antenna 18A, the GPS receiver 18B, and the communication control device 19. The antenna 17A receives the radio waves outputted from the relay 3 of the operation control device 2 illustrated in FIG. 1. The antenna 17A outputs the received radio waves to the on-vehicle wireless communication device 17B. The on-vehicle wireless communication device 17B executes wireless communication via the antenna 17A, the relay 3, and the antenna 4A of the operation control device 2.

The GPS antenna 18A receives radio waves outputted from plural GPS satellites 5A, 5B, and 5C, illustrated in FIG. 1, which form a GPS (Global Positioning System). The GPS antenna 18A outputs the received radio waves to the GPS receiver 18B. The GPS receiver 18B converts the radio waves received by the GPS antenna 18A into an electric signal to calculate position information of the GPS antenna 18A, i.e., position information of the dump truck 10. In this way, the GPS receiver 18B measures the position of the dump truck 10.

The on-vehicle wireless communication device 17B and the GPS receiver 18B are connected to the communication control device 19. The communication control device 19 is connected to the control system 20. The communication control device 19 converts the information from the on-vehicle wireless communication device 17B and the GPS receiver 18B into a format that can be understood by the control system 20. The control system 20 acquires information for allowing the dump truck 10 to travel in an unmanned state from the operation control device 2 via the communication control device 19, the on-vehicle wireless communication device 17B, and the antenna 17A. The control system 20 acquires the position information of the dump truck 10 from the GPS receiver 18B.

(Drive Device 30)

The drive device 30 drives the rear wheels 13R to allow the dump truck 10 to travel. The drive device 30 includes an engine 31 serving as a power source, a torque converter 32, a transmission 33, a propeller shaft 34, and a differential gear 35. The engine 31 is a diesel engine in the present embodiment. However, the engine 31 is not limited to a diesel engine. The output from the engine 31 is transmitted to the transmission 33 via the torque converter 32. The torque converter 32 includes an input shaft to which the output from the engine 31 is inputted and an output shaft that outputs the output from the engine inputted to the input shaft. The torque converter 32 includes a lock-up clutch 32C that directly connects the input shaft and the output shaft. The transmission 33 reduces the rotating speed (engine speed per a unit time) of a crankshaft that is the output shaft of the engine 31 to increase a torque, and outputs the increased torque to the propeller shaft 34.

The propeller shaft 34 connects an output section 33o of the transmission 33 and an input section 35i of the differential gear 35. The propeller shaft 34 transmits the output from the transmission 33 to the differential gear 35. The differential gear 35 transmits the transmitted output from the transmission 33 to the left and right rear wheels 13R to drive these wheels. In this way, the drive device 30 allows the dump truck 10 to travel.

(Transmission 33)

The transmission 33 can make the rotating speed of the engine 31 inputted from an input section 33i different, in other words, change gears, and output the changed speed from the output section 33o. In the present embodiment, the transmission 33 is a power transmission device formed by combining plural planetary gear trains that transmit power from the engine 31, and plural clutches and plural brakes for selecting a rotation element in each of the planetary gear trains. The transmission 33 engages or disengages the clutch with or from the brake to change the rotation element through which the power from the engine 31 transmits, whereby plural different gear ratios can be realized. In this way, in the present embodiment, the dump truck 10 is a mechanical vehicle that travels by transmitting the power generated from the engine 31 to the rear wheels 13R via the torque converter 32, the transmission 33, the propeller shaft 34, and the differential gear 35.

<Control System 20>

Figure 3:
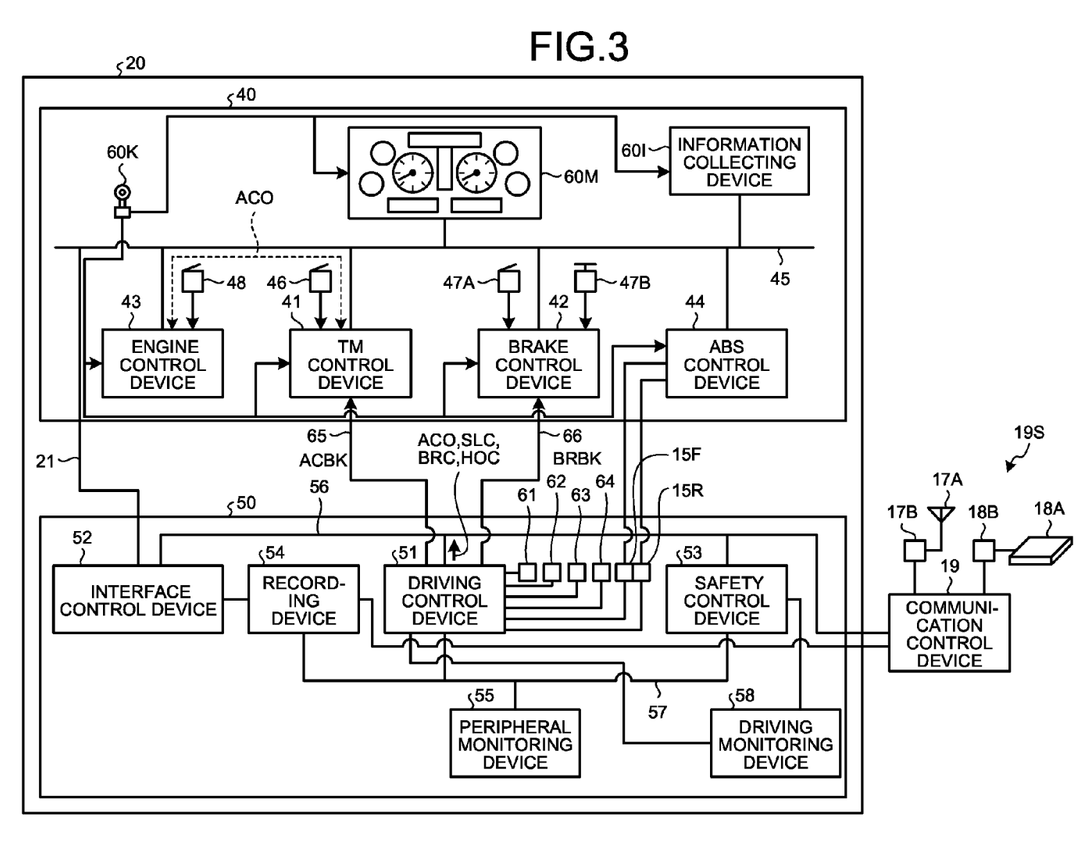
FIG. 3 is a block diagram illustrating a control system mounted in the dump truck.

FIG. 3 is a block diagram illustrating the control system 20 in the dump truck 10. The control system 20 includes a first control system 40 and a second control system 50. The first control system 40 controls the devices mounted on the dump truck 10, such as the engine 31, the transmission 33, and the brake 13B. The first control system 40 allows the dump truck 10 to travel based on the operation by the operator boarding the dump truck 10. The second control system 50 generates a control instruction controlling the dump truck 10 based on the instruction from the operation control device 2 illustrated in FIG. 1 and the information acquired from the communication device 19S. The second control system 50 transmits the generated control instruction to the first control system 40 to allow the dump truck 10 to automatically travel in the unmanned state via the first control system 40.

In the present embodiment, the driving mode for allowing the dump truck 10 to travel by the operation of the operator boarding the dump truck 10 is referred to as a first driving mode. A driving mode for allowing the dump truck 10 to travel without having the operator on the dump truck 10, e.g., for allowing the dump truck 10 to travel based on the information from the outside of the dump truck 10, is referred to as a second driving mode. The first driving mode is a driving mode for allowing the dump truck 10 to travel in a manned state, while the second driving mode is a driving mode for allowing the dump truck 10 to travel in an unmanned state. The second driving mode includes the case where the operator remotely operates an unmanned dump truck, in addition to the case where the control system 20 in the dump truck 10 allows the unmanned dump truck 10 to automatically travel.

(First Control System 40)

The first control system 40 includes a TM (transmission) control device 41, a brake control device 42, an engine control device 43, an ABS (Antilock Brake System) control device 44, a monitor 60M, an information collecting device 60I, and a key switch 60K, for example. The TM control device 41, the brake control device 42, the engine control device 43, the ABS control device 44, the monitor 60M, and the information collecting device 60I are computers including a processing unit such as a CPU (Central Processing Unit) and a storage unit such as ROM (Read Only Memory).

The TM control device 41 controls the transmission 33 and the lock-up clutch 32C in the torque converter 32 illustrated in FIG. 2. The brake control device 42 controls the brake 13B illustrated in FIG. 2. The engine control device 43 controls the engine 31 illustrated in FIG. 2. In the case where the front wheels 13F and the rear wheels 13R are locked when the brake 13B illustrated in FIG. 2 stops these wheels, the ABS control device 44 reduces the braking force of the brake 13B to unlock the front wheels 13F and the rear wheels 13R.

The information collecting device 60I acquires information relating to the status of the dump truck 10 from the TM control device 41, the brake control device 42, the engine control device 43, the ABS control device 44, and various sensors while the dump truck 10 is working, and stores the acquired information in association with the time when the information is acquired. The information in which the information relating to the status of the dump truck 10 and the time when this information is acquired are associated with each other is referred to as operation information. The information collecting device 60I transmits the operation information of the dump truck 10 to the operation control device 2 illustrated in FIG. 1 via the communication device 19S. The operation control device 2 creates a daily report or detects a failure of the dump truck 10, by using the operation information acquired from the information collecting device 60I. In the present embodiment, the dump truck may include an on-vehicle wireless communication device directly connected to an information collecting device 61I, and this information collecting device 61I may transmit the operation information to the operation control device 2 via the on-vehicle wireless communication device without using the communication device 19S.

The monitor 60M displays various information pieces of the dump truck 10. The various information pieces include, for example, a speed of the dump truck 10, i.e., the traveling speed of the dump truck 10, a temperature of cooling water in the engine 31 illustrated in FIG. 2, and various warnings. The monitor 60M displays, for example, a payload that is a load of a cargo loaded on the vessel 12 illustrated in FIG. 2 in the first driving mode. The various information pieces displayed on the monitor 60M include, for example, information (e.g., a fuel amount and a gear shift stage) necessary for the operator who drives the dump truck, when the dump truck 10 travels in the first driving mode. The key switch 60K is connected to a dedicated terminal provided to each of the TM control device 41, the brake control device 42, the engine control device 43, the ABS control device 44, the monitor 60M, and the information collecting device 60I, which devices are included in the control system 20. With this, the key switch 60K turns on or off a power source supplied to these devices, or switches between the first driving mode and the second driving mode. The control system 20 may have a switch for switching between the first driving mode and the second driving mode, in isolation from the key switch 60K.

Each of the TM control device 41, the brake control device 42, the engine control device 43, the ABS control device 44, the monitor 60M, and the information collecting device 60I stores a computer program for realizing its function into its storage unit. In each of the TM control device 41, the brake control device 42, the engine control device 43, the ABS control device 44, the monitor 60M, and the information collecting device 60I, its processing unit reads the computer program necessary for control from its storage unit, and executes a command described in the read computer program. Thus, the devices mounted on the dump truck 10 are controlled.

A shift selector 46 is connected to the TM control device 41. The shift selector 46 designates a gear shift stage of the transmission 33 illustrated in FIG. 2. The shift selector 46 also designates a shift mode, when the transmission 33 automatically shifts a gear shift stage. In the second driving mode, the TM transmission 41 controls the transmission 33 according to the control instruction from the second control system 50. A brake sensor 47A and a hoist sensor 47B are connected to the brake control device 42. The brake sensor 47A detects an operation amount of at least one of a retarder lever and a brake pedal mounted to the driver's room 11DR in the dump truck 10. The brake control device 42 controls a braking state of the brake 13B in the dump truck 10 based on the detected value of the brake sensor 47A. The brake control device 42 operates the brake 13B of the dump truck 10, when detecting the operation of the hoist lever by the hoist sensor 47B. The brake control device 42 also controls the brake 13B according to the control instruction from the second control system 50 in the second driving mode.

An accelerator opening detecting sensor 48 is connected to the engine control device 43. The accelerator opening detecting sensor 48 detects an operation amount of the accelerator pedal mounted to the driver's room 11DR of the dump truck 10. The engine control device 43 controls the engine 31 of the dump truck 10 based on the detected value of the accelerator opening detecting sensor 48. The engine control device 43 controls the engine 31 according to the control instruction from the second control system 50 in the second driving mode. The rotation sensor 15 (the front-wheel rotation sensor 15F and the rear-wheel rotation sensor 15R) is connected to the ABS control device 44. The ABS control device 44 controls the braking force of the brake 13B based on the detected value of the rotation sensor 15. The braking force from the brake 13B is the force applied by the brake 13B for stopping the front wheels 13F or the rear wheels 13R. In a full brake, the braking force becomes the maximum. The braking force is in proportion to a pressure of brake oil in the brake 13B.

As illustrated in FIG. 3, the TM control device 41, the brake control device 42, the engine control device 43, the ABS control device 44, the monitor 60M, and the information collecting device 60I are electrically connected via a communication line 45. Thus, these devices can exchange information with one another via the communication line 45. For example, the TM control device 41, the brake control device 42, the engine control device 43, and the ABS control device 44 can acquire information of the other control devices or values detected by the sensors connected to the other control devices via the communication line 45, and use the acquired information for their own control. For example, the TM control device 41, the brake control device 42, the engine control device 43, and the ABS control device 44 can acquire information of the other control devices or detected values of sensors connected to the other control devices via the communication line 45, and can use the acquired information or values for their own control.

In the present embodiment, a CAN (Controller Area Network) is used for the communication in the first control system 40, more specifically, for the communication among the devices in the first control system 40. The communication line 45 is a wire harness forming the CAN. The communication in the first control system 40 is not limited to the CAN.

(Second Control System 50)

The second control system 50 includes, for example, a driving control device 51, an interface control device 52, a safety control device 53, a recording device 54, a peripheral monitoring device 55, and a driving monitoring device 58. The driving control device 51, the interface control device 52, the safety control device 53, the recording device 54, the peripheral monitoring device 55, and the driving monitoring device 58 are computers including a processing unit such as a CPU (Central Processing Unit) and a storage unit such as ROM (Read Only Memory).

The driving control device 51 acquires information, which is generated by the operation control device 2 for allowing the dump truck 10 to travel in the second driving mode, via the communication control device 19. The driving control device 51 controls the dump truck 10 via the first control system 40 based on the acquired information. Various sensors such as a gyro sensor 61, a speed sensor 62, a steering angle sensor 63, an acceleration sensor 64, the front-wheel rotation sensor 15F, and the rear-wheel rotation sensor 15R are connected to the driving control device 51. The driving control device 51 acquires information detected by the above various sensors, and allows the dump truck 10 to automatically travel in the second driving mode.

The interface control device 52 is connected to the communication line 45 in the first control system 40 by a communication line 21. The interface control device 52 converts the information from the second control system 50 into a format (e.g., communication protocol conversion) understandable by the first control system 40, and transmits the converted information to the first control system 40 via the communication line 21. The interface control device 52 also converts the information from the first control system 40 into a format understandable by the second control system 50, and transmits the converted information to the second control system 50 via the communication line 21. The interface control device 52 also monitors the status of the first control system 40 via the communication line 21. In the present embodiment, the communication line 21 and the communication line 45 in the first control system 40 are different from each other. However, a common line can be used as both the communication line 21 and the communication line 45.

The communication line 21 corresponds to a first communication line used for the communication between the first control system 40 and the second control system 50. In the present embodiment, the first communication line may include the communication line 45 in the first control system 40 and communication lines 56 and 57 in the second control system 50. The first communication line is used to exchange information between the second control system 50 and the first control system 40, when the second control system 50 allows the dump truck 10 to travel in the second driving mode.

In the present embodiment, a CAN is used for the communication between the first control system 40 and the second control system 50, for example. The communication line 21 is a wire harness forming the CAN. The communication between the first control system 40 and the second control system 50 is not limited to the CAN.

The safety control device 53 controls a head lamp, an indicator, a horn, an engine starter, and a parking brake in the dump truck 10. The recording device 54 records the position of the dump truck 10 acquired from the GPS receiver 18B with a lapse of time, thereby recording the traveling route of the dump truck 10.

The peripheral monitoring device 55 includes a radar sensor and a laser sensor, for example, to detect an object ahead in the advancing direction of the dump truck 10 or an object around the dump truck 10. The driving control device 51 and the safety control device 53 operate the brake 13B, reduce the output from the engine 31, or turn the front wheels 13F, in the dump truck 10 based on the information of the object detected by the peripheral monitoring device 55, when the dump truck 10 travels in the second driving mode. In the case where an object is detected ahead of the dump truck 10 in the advancing direction, for example, the driving control device 51 operates the brake 13B of the dump truck 10 to decelerate the dump truck 10, stop the dump truck 10, or turns the front wheels 13F, to avoid the collision against the object. In the case where the peripheral monitoring device 55 detects that it grows dark, for example, the safety control device 53 turns on the head lamp of the dump truck 10.

The driving monitoring device 58 is connected to both the driving control device 51 and the safety control device 53 to send and receive information to and from these devices. The driving monitoring device 58 controls the first control system 40 to operate the brake 13B illustrated in FIG. 2 or to reduce the output from the engine 31, when the driving control device 51 loses its function, for example.

Each of the driving control device 51, the interface control device 52, the safety control device 53, and the driving monitoring device 58 stores a computer program for realizing its function into its storage unit. In each of the driving control device 51, the interface control device 52, the safety control device 53, and the driving monitoring device 58, its processing unit reads the computer program necessary for control from its storage unit, and executes a command described in the read computer program. Thus, these devices control the dump truck 10.

The driving control device 51, the interface control device 52, and the safety control device 53 are electrically connected via a communication line 56. Thus, these devices can exchange information with one another. For example, the driving control device 51, the interface control device 52, and the safety control device 53 can acquire information of the other control devices or values detected by the sensors connected to the other control devices via the communication line 56, and use the acquired information for their own control.

The communication line 56 is connected to the communication control device 19. The driving control device 51 acquires the information, which is transmitted from the operation control device 2 illustrated in FIG. 1 for allowing the dump truck 10 to automatically travel in the second driving mode, from the communication control device 19 via the communication line 56. The second control system 50 transmits the information relating to the status of the dump truck 10, which is now automatically traveling in the second driving mode, to the operation control device 2 via the communication line 56 and the communication control device 19. The TM control device 41, the engine control device 43, the brake control device 42, and the ABS control device 44 in the first control system 40 can acquire information detected by the various sensors, such as the gyro sensor 61 and the speed sensor 62, connected to the driving control device 51 in the second control system 50 via the communication line 56, the interface control device 52, the communication line 21, and the communication line 45.

The driving control device 51, the safety control device 53, the recording device 54, and the peripheral monitoring device 55 are electrically connected to one another via a communication line 57. With this, these devices can exchange information with one another. The driving control device 51, the interface control device 52, and the recording device 54 can acquire information that is detected by the peripheral monitoring device 55 and relates to an object around the dump truck 10 via the communication line 57, and use the acquired information for the control in the second driving mode.

In the present embodiment, a CAN is used for the communication in the second control system 50, more specifically, for the communication among the devices in the second control system 50. The communication lines 56 and 57 are wire harnesses forming the CAN. The communication in the second control system 50 is not limited to the CAN.

The driving control device 51 and the TM control device 41 in the first control system 40 are connected by an engine control signal line 65 corresponding to the second communication line. The driving control device 51 and the brake control device 42 in the first control system 40 are connected by a brake control signal line 66 corresponding to the second communication line. The second communication line is used to transmit information to the first control system 40 from the second control system 50, when the second control system 50 allows the dump truck 10 to automatically travel in the second driving mode, and when the exchange of information between the second control system 50 and the first control system 40 via the first communication line becomes impossible due to the occurrence of a communication abnormality on the first communication line, for example. The information transmission system by the engine control signal line 65 and the brake control signal line 66, which correspond to the second communication line, is different from the communication system by the communication line 21 that establishes communication between the first control system 40 and the second control system 50. In the present embodiment, a CAN is used for the communication by the communication line 21. Therefore, the communication by the engine control signal line 65 and the brake control signal line 66 uses a communication system other than the CAN.

The driving control device 51 generates a first accelerator opening instruction ACO, a shift control instruction SLC, a first brake instruction BRC, and a hoist instruction HOC, and transmits the generated instructions to the first control system 40 via the communication line 56, the interface control device 52, and the communication line 21. The first accelerator opening instruction ACO is information for controlling the engine 31 illustrated in FIG. 2. The first brake instruction BRC is information for controlling the brake 13B illustrated in FIG. 2. The shift control instruction SLC is information for controlling the transmission 33 illustrated in FIG. 2. The hoist instruction HOC is information for elevating the vessel 12 illustrated in FIG. 2.

In the first driving mode, the engine control device 43 in the first control system 40 acquires the first accelerator opening instruction ACO detected by the accelerator opening detecting sensor 48 to control the output of the engine 31 illustrated in FIG. 2. The TM control device 41 in the first control system 40 acquires the shift control instruction SLC and the first accelerator opening instruction ACO to change the gear shift stage of the transmission 33 illustrated in FIG. 2. In the first driving mode, the TM control device 41 acquires the first accelerator opening instruction ACO detected by the accelerator opening detecting sensor 48 from the engine control device 43, and acquires the shift control instruction SLC generated by the shift selector 46 from the shift selector 46.

In the second driving mode, the TM control device 41 acquires the first accelerator opening instruction ACO generated by the driving control device 51 in the second control system 50 from the communication line 56, the interface control device 52, the communication line 21, and the communication line 45. The TM control device 41 changes the gear shift stage of the transmission 33 by using the accelerator opening instruction ACO generated by the driving control device 51. The engine control device 43 acquires the first accelerator opening instruction ACO from the TM control device 41 to control the output of the engine 31.

The brake control device 42 in the first control system 40 acquires the first brake instruction BRC, and controls the brake 13B illustrated in FIG. 2. The brake control device 42 in the first control system 40 acquires the hoist instruction HOC, and operates the brake 13B when the vessel 12 illustrated in FIG. 2 is lifted, i.e., hoisted.

When automatically driving the dump truck 10 in the second driving mode, the driving control device 51 generates at least one of the accelerator opening instruction ACO, the shift control instruction SLC, the brake instruction BRC, and the hoist instruction HOC based on the information, which is acquired from the operation control device 2 for driving the dump truck 10 in the second driving mode. The driving control device 51 then controls the dump truck 10 via the first control system 40 with at least one of the accelerator opening instruction ACO, the shift control instruction SLC, the brake instruction BRC, and the hoist instruction HOC.

The driving control device 51 generates a second accelerator opening instruction ACBK and a second brake instruction BRBK, and transmits the generated instructions to the first control system 40. The second accelerator opening instruction ACBK is information for controlling the engine 31 illustrated in FIG. 2. The second brake instruction BRBK is information for controlling the brake 13B illustrated in FIG. 2. The control system 20 controls the engine 31 and the brake 13B illustrated in FIG. 2 by using the second accelerator opening instruction ACBK and the second brake instruction BRBK, when the exchange of information between the second control system 50 and the first control system 40 via the communication line 21 corresponding to the first communication line becomes impossible in the second driving mode.

The driving control device 51 transmits the second accelerator opening instruction ACBK to the TM control device 41 via the engine control signal line 65, and transmits the second brake instruction BRBK to the brake control device 42 via the brake control signal line 66. In the present embodiment, the driving control device 51 transmits the second accelerator opening instruction ACBK and the second brake instruction BRBK to the TM control device 41 and the brake control device 42, when allowing the dump truck 10 to travel in at least the second driving mode. The driving control device 51 may transmit the second accelerator opening instruction ACBK and the second brake instruction BRBK to the TM control device 41 and the brake control device 42, when allowing the dump truck 10 to travel in the first driving mode.

When the situation in which the first control system 40 cannot acquire information from the second control system 50 via the communication line 21 is continued while the second driving mode is selected, the TM control device 41 acquires the second accelerator opening instruction ACBK from the engine control signal line 65, and the brake control device 42 acquires the second brake instruction BRBK from the brake control signal line 66. The engine control device 43 acquires the second accelerator opening instruction ACBK from the TM control device 41. The TM control device 41 controls the dump truck 10 traveling in the second driving mode by using the acquired second accelerator opening instruction ACBK, the brake control device 42 controls the dump truck 10 traveling in the second driving mode by using the acquired second brake instruction BRBK, and the engine control device 43 controls the dump truck 10 traveling in the second driving mode by using the acquired second accelerator opening instruction ACBK. For example, the TM control device 41 changes the gear shift stage of the transmission 33 by using the acquired second accelerator opening instruction ACBK. The brake control device 42 operates the brake 13B by using the acquired second brake instruction BRBK. The engine control device 43 acquires the acquired second accelerator opening instruction ACBK to control the output of the engine 31.

The second accelerator opening instruction ACBK and the second brake instruction BRBK generated by the driving control device 51 are transmitted to the first control system 40 via the engine control signal line 65 and the brake control signal line 66, which correspond to the second communication line, based on the system different from the communication system of the communication line 21 corresponding to the first communication line. In the present embodiment, a CAN is used for the communication by the communication line 21, while a system of transmitting an instruction value undergoing PWM (Pulse Width Modulation) is used for the information transmission through the engine control signal line 65 and the brake control signal line 66. The information transmission through the engine control signal line 65 and the brake control signal line 66 is not limited to the PWM system, and information may be transmitted with an analog signal, for example.

Figure 4:
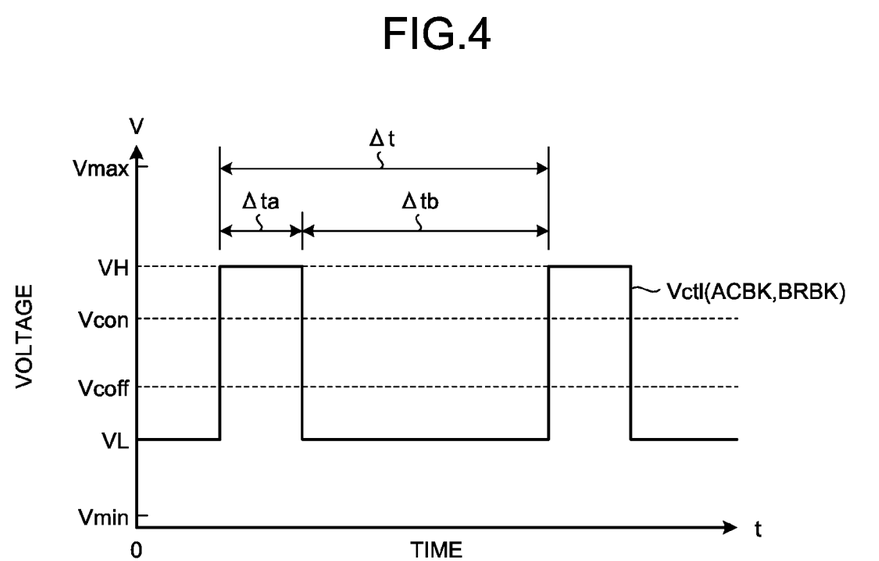
FIG. 4 is a diagram for describing a transmission of information through a PWM according to the present embodiment.

FIG. 4 is a diagram describing information transmission by PWM according to the present embodiment. The second accelerator opening instruction ACBK determines an accelerator opening for controlling the output of the engine 31 illustrated in FIG. 2. The second brake instruction BRBK determines an operating amount of the brake 13B for controlling the braking force of the brake 13B illustrated in FIG. 2. The driving control device 51 illustrated in FIG. 3 converts the second accelerator opening instruction ACBK and the second brake instruction BRBK into a control signal Vctl that repeatedly becomes ON and OFF in a period $\Delta t$ as illustrated in FIG. 4. The frequency of the control signal Vctl is $1/\Delta t$. In the present embodiment, the period $\Delta t$ and the frequency $1/\Delta t$ of the control signal Vctl are constant, and do not change with the time t.

The time when the control signal Vctl is ON is an ON time $\Delta ta$, and the time when the control signal Vctl is OFF is an OFF time $\Delta tb$. The ratio of the ON time $\Delta ta$ in the time for one period $\Delta t$ of the control signal Vctl, i.e., for the total time of the ON time $\Delta ta$ and the OFF time $\Delta tb$, is referred to as a duty ratio RDT. The duty ratio RDT can be represented by an equation (1).

$$RDT = \Delta ta / (\Delta ta + \Delta tb) \tag{1}$$

In the present embodiment, the duty ratio RDT of the control signal Vctl is changed by changing the accelerator opening and the braking force with the PWM. For example, the more the duty ratio RDT of the second accelerator opening instruction ACBK increase, the more the accelerator opening increases. The more the duty ratio RDT of the second brake instruction BRBK increases, the more the braking force of the brake 13B increases.

The relationship between the duty ratio of the second accelerator opening instruction ACBK and the accelerator opening and the relationship between the duty ratio of the second brake instruction BRBK and the braking force are not limited to those described above. For example, when the duty ratio RDT of the second accelerator opening instruction ACBK is changed from 10% to 90%, the accelerator opening may be changed from 0% to 100%. When the duty ratio RDT of the second brake instruction BRBK is changed from 10% to 90%, the braking force may be changed from 0% to the maximum value, for example.

The driving control device 51 illustrated in FIG. 3 determines the duty ratio RDT of the control signal Vctl outputted to the first control system 40 according to the instruction value of the second accelerator opening instruction ACBK and the instruction value of the second brake instruction BRBK. The driving control device 51 then generates the control signal Vctl with the determined duty ratio RDT, and outputs the generated control signal to the engine control signal line 65 and the brake control signal line 66. In this way, the driving control device 51 generates the control signal Vctl in which the information for controlling the engine 31 and the information for controlling the brake 13B are converted into a pulse width.

The TM control device 41 in the first control system 40 acquires the control signal Vctl corresponding to the second accelerator opening instruction ACBK, and obtains the duty ratio RDT from the ON time $\Delta ta$ and the OFF time $\Delta tb$. The TM control device 41 obtains the accelerator opening from the duty ratio RDT to generate the first accelerator opening instruction ACO. The TM control device 41 controls the transmission 33 by using the first accelerator opening instruction ACO obtained as described above. The engine control device 43 acquires the first accelerator opening instruction ACO from the TM control device 41 to control the engine 31.

The brake control device 42 in the first control system 40 acquires the control signal Vctl corresponding to the second brake instruction BRBK, and obtains the duty ratio RDT from the ON time Δta and the OFF time Δtb. The brake control device 42 obtains the braking force of the brake 13B from the duty ratio RDT to generate the first brake instruction BRC. The brake control device 42 controls the brake 13B by using the first brake instruction BRC obtained as described above. For example, the brake control device 42 adjusts the braking force generated from the brake 13B by controlling thrust force of a master cylinder that causes the brake 13B to generate the braking force.

The control signal Vctl is a signal whose voltage is changed from VL to VH in the period Δt. VL is a value greater than 0 volt. In the present embodiment, the TM control device 41 and the brake control device 42 in the first control system 40 determine whether the control signal Vctl is ON or OFF by using an ON determination voltage threshold value Vcon and an OFF determination voltage threshold value Vcoff. If the control signal Vctl is not less than the ON determination voltage threshold value Vcon, the TM control device 41 and the brake control device 42 in the first control system 40 determine that the control signal Vctl is ON, and if the control signal Vctl is not more than the OFF determination voltage threshold value Vcoff, they determine that the control signal Vctl is OFF. In the example in FIG. 4, when the control signal Vctl is VH, VH≥Vcon is established, so that the control signal Vct1 is ON. When the control signal Vctl is VL, VL≤Vcoff is established, so that the control signal Vctl is OFF.

In the present embodiment, the TM control device 41 and the brake control device 42 determine whether the control signal Vctl is normal or not by using the minimum voltage Vmin and the maximum voltage Vmax. Specifically, the TM control device 41 and the brake control device 42 determine that the control signal Vctl is normal, if the control signal Vctl is not less than the minimum voltage Vmin and not more than the maximum voltage Vmax, and if the control signal Vctl is less than the minimum voltage Vmin and more than the maximum voltage Vmax, they determine that the control signal Vctl is abnormal. According to this determination process, whether the control signal Vctl is abnormal or not can easily be determined. When determining that the control signal Vctl is abnormal, the TM control device 41 and the brake control device 42 control the engine 31 and the brake 13B without using the control signal Vctl. With this control, safety can be enhanced.

<Control Method for Work Vehicle>

Figure 5:
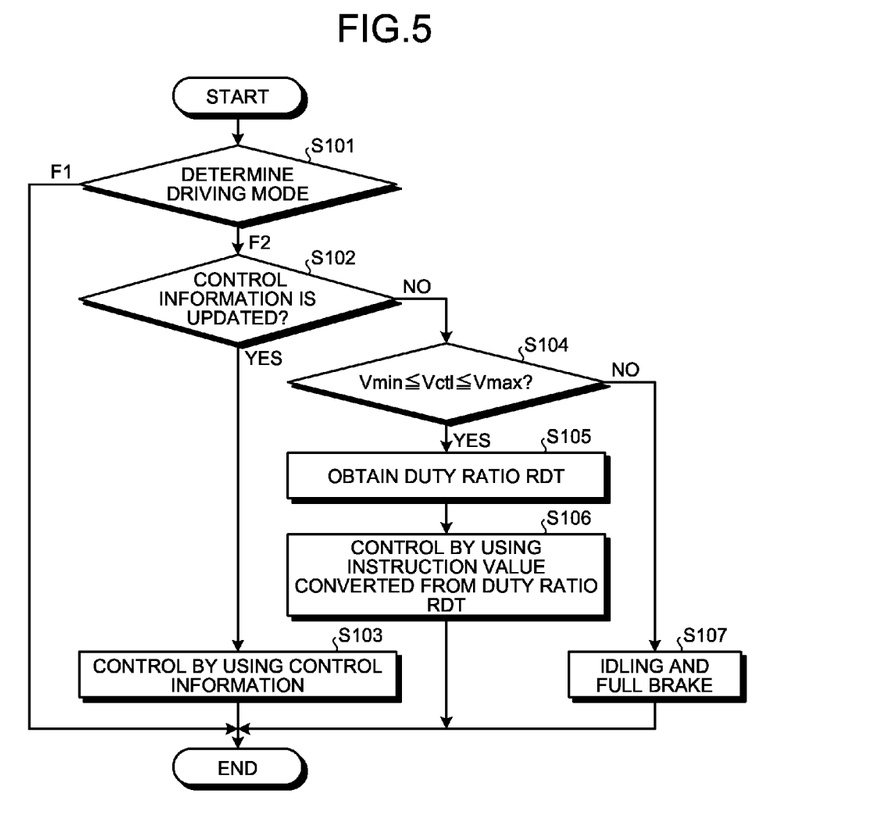
FIG. 5 is a flowchart illustrating a procedure of a control method for the work vehicle according to the present embodiment.

FIG. 5 is a flowchart illustrating a procedure of a control method for the work vehicle according to the present embodiment. In step S101, the first control system 40 determines a driving mode of the dump truck 10. The driving mode can be determined based on the position of the key switch 60K illustrated in FIG. 3. Specifically, if the key switch 60K selects the first driving mode, the first control system 40 determines that the driving mode is the first driving mode, and if the key switch 60K selects the second driving mode, the first control system 40 determines that the driving mode is the second driving mode.

When the dump truck 10 travels in the first driving mode (F1 in step S101), the first control system 40 ends the control method for the work vehicle. When the dump truck 10 travels in the second driving mode (F2 in step S101), the first control system 40 determines in step S102 whether the control information transmitted from the second control system 50 via the communication line 21 is updated or not. The control information is the first accelerator opening instruction ACO, the first brake instruction BRC, the shift control instruction SLC, and the hoist instruction HOC, and includes at least the first accelerator opening instruction ACO and the first brake instruction BRC.

When the situation in which the control information is not transmitted from the second control system 50 via the communication line 21 is continued, e.g., when the control information is not updated even if a predetermined time has elapsed, the first control system 40 determines that the control information is not updated. When the control information is updated within the predetermined time, the first control system 40 determines that the control information is updated. The predetermined time set for determining whether the control information is updated or not can be 0.1 second to 1 second, for example. However, the predetermined time is not limited thereto, and can be set according to the specification of the control system 20 and the dump truck 10.

When determining that the control information from the second control system 50 is updated (Yes in step S102), the first control system 40 controls the dump truck 10 by using the updated control information to allow the dump truck 10 to travel in the second driving mode in step S103. When determining that the control information from the second control system 50 is not updated (No in step S102), the first control system 40 determines in step S104 whether or not the control signal Vctl is equal to or greater than the minimum voltage Vmin and equal to or less than the maximum voltage Vmax. In other words, the first control system 40 determines whether the control signal Vctl is normal or not.

In the case of Vmin≤Vctl≤Vmax (Yes in step S104), the control signal Vctl is normal. In this case, the first control system 40, more specifically the TM control device 41 to which the engine control signal line 65 is connected and the brake control device 42 to which the brake control signal line 66 is connected, obtain the duty ratio RDT of the control signal Vctl in step S105. The TM control device 41 obtains the duty ratio RDT of the control signal Vctl of the second accelerator opening instruction ACBK acquired from the engine control signal line 65. The brake control device 42 obtains the duty ratio RDT of the control signal Vctl of the second brake instruction BRBK acquired from the brake control signal line 66.

In step S106, the TM control device 41 controls the transmission 33 by using the instruction value converted from the duty ratio RDT, i.e., the first accelerator opening instruction ACO. The brake control device 42 controls the brake 13B by using the instruction value converted from the duty ratio RDT, i.e., the first brake instruction BRC. The engine control device 43 acquires the first accelerator opening instruction ACO from the TM control device 41 to control the engine 31.

In the case of Vmin>Vctl or Vctl>Vmax (No in step S104), the control signal Vctl is outside the normal range, i.e., abnormal. In this case, the TM control device 41 in the first control system 40 controls the engine 31 to be in an idling state in step S107. The brake control device 42 in the first control system 40 controls the brake 13B to be in a full-brake state, i.e., to allow the brake 13B to generate the maximum braking force. According to this control, the dump truck 10 stops. The TM control device 41 may change the gear shift stage of the transmission 33 to a low-side. This control can stop the dump truck 10 more quickly by the engine brake. After the dump truck 10 stops, the TM control device 41 may change the gear shift stage of the transmission 33 to a parking stage, according to need. This control can reduce the possibility that the stopped dump truck 10 starts to move.

When the communication line 21, the communication line 45, the communication line 56, or the communication line 57, which corresponds to the first communication line, is broken while the dump truck 10 travels in the second driving mode, for example, the information transmitted from the second control system 50 to the first control system 40 might be disrupted. In such case, the first control system 40 acquires the second accelerator opening instruction ACBK and the second brake instruction BRBK from the second control system 50 by using the engine control signal line 65 and the brake control signal line 66, which correspond to the second communication line different from the first communication line. With this configuration, the second control system 50 and the first control system 40 can continue the control in the second driving mode to allow the dump truck 10 to automatically travel in the unmanned state, even if failure occurs in the communication in the dump truck 10, specifically in the first communication line.

The second control system 50 transmits the control signal Vctl of the second accelerator opening instruction ACBK and the control signal Vctl of the second brake instruction BRBK to the first control system 40 via the engine control signal line 65 and the brake control signal line 66 by using the information transmission system different from the communication system in the first control system 40. Specifically, since the information transmission system is different between the first communication line and the second communication line, the possibility of the occurrence of communication disruption due to the similar cause (e.g., propagation noise) to the communication disruption in the case of using the first communication line can be reduced, when the second communication line is used. Accordingly, reliability of the control system 20 is enhanced.

The control signal Vctl of the second accelerator opening instruction ACBK and the control signal Vctl of the second brake instruction BRBK are modulated with the PWM method, and the resultant signals are transmitted to the first control system 40 via the engine control signal line 65 and the brake control signal line 66. Therefore, the control signal Vctl is less affected by noise generated due to a shift in a ground potential difference. The shift in the ground potential difference is caused because the driving control device 51 in the second control system 50 that transmits information and the TM control device 41 and the engine control device 43 in the first control system 40 that receive information are apart from each other. Accordingly, the second accelerator opening instruction ACBK and the second brake instruction BRBK can stably be transmitted to the first control system 40 by the communication via the engine control signal line 65 and the brake control signal line 66. In addition, the limitation concerning the arrangement of the first control system 40, the second control system 50, and the devices in these control systems, e.g., the limitation of mounting the devices to be close to each other, can be reduced.

In the present embodiment, the control signal Vctl is determined to be OFF when it is lower than the OFF determination voltage threshold value Vcoff that is greater than 0 V. According to this determination, the TM control device 41 and the engine control device 43 in the first control system 40 can surely detect that the control signal Vctl is OFF, even if the ground potential of the first control system 40 varies. The TM control device 41 and the engine control device 43 also determine that the control signal Vctl is normal when the control signal Vctl is equal to or greater than the minimum voltage Vmin and equal to or less than the maximum voltage Vmax. Therefore, the TM control device 41 and the engine control device 43 can easily detect that the control signal Vctl is abnormal before starting the control with the control signal Vctl.

The present embodiment describes a method of switching between the first driving mode and the second driving mode by using the key switch 60K. However, the method of switching between the first driving mode and the second driving mode is not limited to the one using the key switch 60K. For example, the driving control device 51 may include a changeover switch to determine that the driving mode is the first driving mode or the second driving mode based on a signal from the changeover switch, and select the determined driving mode. The driving control device 51 may also use information relating to the status of the dump truck 10, such as parking brake information, in addition to the signal from the above changeover switch, to determine that the driving mode is the first driving mode or the second driving mode, and select the determined driving mode.

The present embodiment describes, as one example, a work vehicle that travels in an unmanned state based on the information acquired by external communication in the second driving mode. However, the work vehicle may automatically travel based on information of traveling data (e.g., traveling route data or speed data) stored beforehand in a system in the work vehicle by an operator.

The present embodiment describes the case where the second control system 50 used for the unmanned traveling is provided in isolation from the first control system 40. However, a control system formed by combining the first control system 40 and the second control system 50 may be used.

While a certain embodiment has been described, the above description is not intended to limit the scope of the present embodiment. The components described above include those easily considered by a person skilled in the art, those substantially the same, and their equivalents. The above components can appropriately be combined. Furthermore, various omissions, substitutions, or modifications may be made without departing from the spirit of the present embodiment.

REFERENCE SIGNS LIST

1 UNMANNED DUMP OPERATION SYSTEM
2 OPERATION CONTROL DEVICE
3 RELAY DEVICE
4 WIRELESS COMMUNICATION DEVICE
4A ANTENNA
10 DUMP TRUCK
11 VEHICLE BODY
12 VESSEL
13B BRAKE
13F FRONT WHEEL
13R REAR WHEEL
15 ROTATION SENSOR
16 SUSPENSION PRESSURE SENSOR
19 COMMUNICATION CONTROL DEVICE
19S COMMUNICATION DEVICE
20 CONTROL SYSTEM
21 COMMUNICATION LINE
30 DRIVE DEVICE
31 ENGINE
32 TORQUE CONVERTER
33 TRANSMISSION
40 FIRST CONTROL SYSTEM
41 TM CONTROL DEVICE
42 BRAKE CONTROL DEVICE

43 ENGINE CONTROL DEVICE
44 ABS CONTROL DEVICE
45 COMMUNICATION LINE
50 SECOND CONTROL SYSTEM
51 DRIVING CONTROL DEVICE
52 INTERFACE CONTROL DEVICE
53 SAFETY CONTROL DEVICE
54 RECORDING DEVICE
55 PERIPHERAL MONITORING DEVICE
56, 57 COMMUNICATION LINE
58 DRIVING MONITORING DEVICE
60I INFORMATION COLLECTING DEVICE
60K KEY SWITCH
60M MONITOR
65 ENGINE CONTROL SIGNAL LINE
66 BRAKE CONTROL SIGNAL LINE
ACO FIRST ACCELERATOR OPENING INSTRUCTION
ACBK SECOND ACCELERATOR OPENING INSTRUCTION
BRC FIRST BRAKE INSTRUCTION
BRBK SECOND BRAKE INSTRUCTION
RDT DUTY RATIO

The invention claimed is:

1. A work vehicle comprising:
a first control system that includes one or more first processors to control a traveling of the work vehicle;
a second control system that includes one or more second processors to control the traveling of the work vehicle via the first control system by using set information;
a first communication line used for communication between the first control system and the second control system; and
a second communication line that transmits information to the first control system from the second control system, wherein
the second control system generates information for controlling an engine of the work vehicle and information for controlling a brake device of the work vehicle, and transmits the information for controlling the engine and the information for controlling the brake device to the first control system via the second communication line by a second information transmission system different from a first information transmission system of the communication by the first communication line.

2. The work vehicle according to claim 1, comprising:
a communication device provided to the work vehicle, the communication device making communication with an outside of the work vehicle, wherein
the set information is information acquired from the communication device.

3. The work vehicle according to claim 1, wherein
the first control system receives the information for controlling the engine and the information for controlling the brake device from the second control system via the second communication line, when the information for controlling the engine and the information for controlling the brake device is not transmitted from the second control system via the first communication line.

4. The work vehicle according to claim 1, wherein
the second control system generates a control signal formed by converting the information for controlling the engine and the information for controlling the brake device into a pulse width, and outputs the generated control signal to the second communication line.

5. The work vehicle according to claim 4, wherein
the first control system brings the engine into an idling state to cause the brake device to generate maximum braking force, when a magnitude of the control signal is outside a normal range.

6. A work vehicle that switches between a first driving mode for allowing the work vehicle to travel in a manned state and a second driving mode for allowing the work vehicle to travel in an unmanned state, the work vehicle comprising:
a communication device provided to the work vehicle, the communication device making communication with an outside of the work vehicle;
a first control system that includes one or more first processors to control a traveling of the work vehicle;
a second control system that includes one or more second processors to control the traveling of the work vehicle via the first control system by using information acquired from the communication device in the second driving mode;
a first communication line used for communication between the first control system and the second control system; and
a second communication line that transmits information to the first control system from the second control system, wherein
the second control system generates information for controlling an engine of the work vehicle and information for controlling a brake device of the work vehicle, and outputs the information for controlling the engine and the information for controlling the brake device to the first control system via the second communication line as a control signal formed by converting the generated information for controlling the engine and the information for controlling the brake device into a pulse width, when the information for controlling the engine and the information for controlling the brake device is not transmitted from the second control system via the first communication line in the second driving mode.

7. A control method of controlling a work vehicle, the control method comprising:
switching between a first driving mode for allowing the work vehicle to travel in a manned state and a second driving mode for allowing the work vehicle to travel in an unmanned state;
controlling, by a first control system of the work vehicle that includes one or more first processors, a traveling of the work vehicle;
controlling, by a second control system of the work vehicle that includes one or more second processors, the traveling of the work vehicle via the first control system by using set information in the second driving mode;
communicating, via a first communication line, between the first control system and the second control system;
transmitting, via a second communication line, information for controlling an engine of the work vehicle and information for controlling a brake device of the work vehicle to the first control system from the second control system with a second information transmission system different from a first information transmission system of the first communication line;
generating the information for controlling the engine of the work vehicle and the information for controlling the brake device of the work vehicle; and
transmitting the information for controlling the engine and the information for controlling the brake device to the first control system via the second communication line as a control signal by converting the information for controlling the engine and the information for controlling the brake device into a pulse width, when the information for controlling the engine and the information for controlling the brake device is not transmitted from the second control system via the first communication line in the second driving mode.

8. The control method for a work vehicle according to claim 7, wherein
the work vehicle includes a communication device that makes communication with an outside of the work vehicle, and
the set information is information acquired from the communication device.

* * * * *